(12) United States Patent  (10) Patent No.: US 9,172,704 B2
Rungta et al.  (45) Date of Patent: Oct. 27, 2015

(54) SYSTEM FOR ALLOCATING A WORK REQUEST

(71) Applicant: BANK OF AMERICA CORPORATION, Charlotte, NC (US)

(72) Inventors: Neelam Rungta, Hyderabad (IN); Pratibha Sharma, Gurgaon (IN); Tusnin Das, Hyderabad (IN); Deepak Aswani, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 9 days.

(21) Appl. No.: 14/181,399

(22) Filed: Feb. 14, 2014

(65) Prior Publication Data

US 2015/0237051 A1  Aug. 20, 2015

(51) Int. Cl.
*G06F 15/16*  (2006.01)
*H04L 29/06*  (2006.01)

(52) U.S. Cl.
CPC .............. *H04L 63/10* (2013.01); *H04L 63/08* (2013.01)

(58) Field of Classification Search
CPC .............. G06F 9/46; G06F 9/48; G06F 9/50; G06F 9/505; G06F 9/5083; G06F 9/4881; G06F 8/20; G06F 11/34; G06F 17/30; G06F 7/00; G06Q 10/06
USPC ............. 726/5; 709/226, 238; 711/1, 203; 718/102, 103, 104
See application file for complete search history.

(56) References Cited

U.S. PATENT DOCUMENTS

| | | | |
|---|---|---|---|
| 5,740,437 A * | 4/1998 | Greenspan et al. | 718/104 |
| 5,881,238 A * | 3/1999 | Aman et al. | 709/226 |
| 8,549,527 B2 * | 10/2013 | Bagheri et al. | 718/103 |
| 2005/0256971 A1 * | 11/2005 | Colrain et al. | 709/238 |

* cited by examiner

*Primary Examiner* — Thanhnga B Truong
(74) *Attorney, Agent, or Firm* — Michael A. Springs; Moore & Van Allen PLLC; Anup Shrinivasan

(57) ABSTRACT

Embodiments of the present invention are directed to a system, method, and computer program product for allocating work requests. A system is configured to initiate the presentation of a first user interface to enable a first user to receive a work request received from a source; assign a category to the work request based on at least an objective and a priority level associated with the work request; and allocate the work request to a second user based on at least the category; transmit the allocated work request to the second user; initiate the presentation of a second user interface to enable a second user to retrieve the work request, and process the work request, wherein processing the work request further comprises addressing the work request based on at least the status and the priority level; and transmit the processed work request to third user for a quality assessment.

20 Claims, 15 Drawing Sheets

Table 600 (420):

| ASSOCIATES | NEW QUERY | WIP | PENDING | COMPLETED | QC DONE(ERROR) | QC DONE(NON-ERROR) | RESPONSE | NOT IN SYNC | TOTAL COUNT |
|---|---|---|---|---|---|---|---|---|---|
| ASSOCIATE 1 | 0 | 3 | 0 | 0 | 0 | 0 | 0 | 0 | 21 |
| ASSOCIATE 2 | 0 | 0 | 0 | 0 | 0 | 0 | 0 | 0 | 1 |
| ASSOCIATE 3 | 0 | 0 | 0 | 0 | 0 | 0 | 0 | 0 | 97 |
| ASSOCIATE 4 | 0 | 0 | 0 | 0 | 0 | 0 | 0 | 0 | 62 |
| ASSOCIATE 5 | 0 | 0 | 0 | 0 | 0 | 0 | 0 | 0 | 10 |
| ASSOCIATE 6 | 3 | 0 | 0 | 0 | 0 | 0 | 0 | 0 | 0 |
| ASSOCIATE 7 | 0 | 0 | 0 | 0 | 0 | 0 | 0 | 12 | 16 |
| ASSOCIATE 8 | 0 | 0 | 0 | 0 | 0 | 0 | 0 | 0 | 3 |
| ASSOCIATE 9 | 0 | 0 | 0 | 0 | 0 | 0 | 0 | 0 | 40 |
| ASSOCIATE 10 | 0 | 0 | 0 | 0 | 0 | 0 | 0 | 0 | 19 |
| ASSOCIATE 11 | 0 | 0 | 0 | 0 | 0 | 0 | 0 | 0 | 0 |
| ASSOCIATE 12 | 0 | 0 | 0 | 0 | 0 | 0 | 1 | 0 | 81 |
| ASSOCIATE 13 | 0 | 1 | 0 | 0 | 0 | 0 | 0 | 5 | 9 |
| ASSOCIATE 14 | 0 | 0 | 0 | 0 | 0 | 0 | 0 | 0 | 10 |
| ASSOCIATE n | | | | | | | | | |

Table 312e:

| ASSOCIATES | RED CATEGORY | GREEN CATEGORY | BLUE | YELLOW | ORANGE | PURPLE | BROWN | WHITE | BLACK |
|---|---|---|---|---|---|---|---|---|---|
| ASSOCIATE 1 | 1 | 0 | 0 | 0 | 0 | 0 | 0 | 0 | 0 |
| ASSOCIATE 2 | 0 | 0 | 0 | 0 | 0 | 0 | 0 | 0 | 0 |
| ASSOCIATE 3 | 2 | 0 | 0 | 0 | 0 | 0 | 0 | 0 | 0 |
| ASSOCIATE 4 | 2 | 0 | 0 | 0 | 0 | 0 | 0 | 0 | 0 |
| ASSOCIATE 5 | 0 | 0 | 0 | 0 | 0 | 0 | 0 | 0 | 0 |
| ASSOCIATE 6 | 0 | 0 | 0 | 1 | 1 | 0 | 0 | 2 | 2 |
| ASSOCIATE 7 | 0 | 2 | 1 | 0 | 0 | 0 | 0 | 0 | 0 |
| ASSOCIATE 8 | 1 | 0 | 0 | 1 | 0 | 0 | 0 | 0 | 0 |
| ASSOCIATE 9 | 0 | 0 | 1 | 0 | 0 | 1 | 0 | 1 | 0 |
| ASSOCIATE 10 | 0 | 2 | 0 | 0 | 0 | 1 | 0 | 0 | 1 |
| ASSOCIATE 11 | 0 | 0 | 0 | 0 | 0 | 1 | 1 | 0 | 0 |
| ASSOCIATE 12 | 0 | 0 | 0 | 0 | 1 | 0 | 1 | 0 | 0 |
| ASSOCIATE 13 | 0 | 0 | 0 | 0 | 0 | 0 | 2 | 0 | 0 |
| ASSOCIATE 14 | 0 | 0 | 0 | 0 | 0 | 0 | 0 | 0 | 0 |
| ASSOCIATE n | 0 | 0 | 0 | 0 | 0 | 0 | 0 | 0 | 0 |

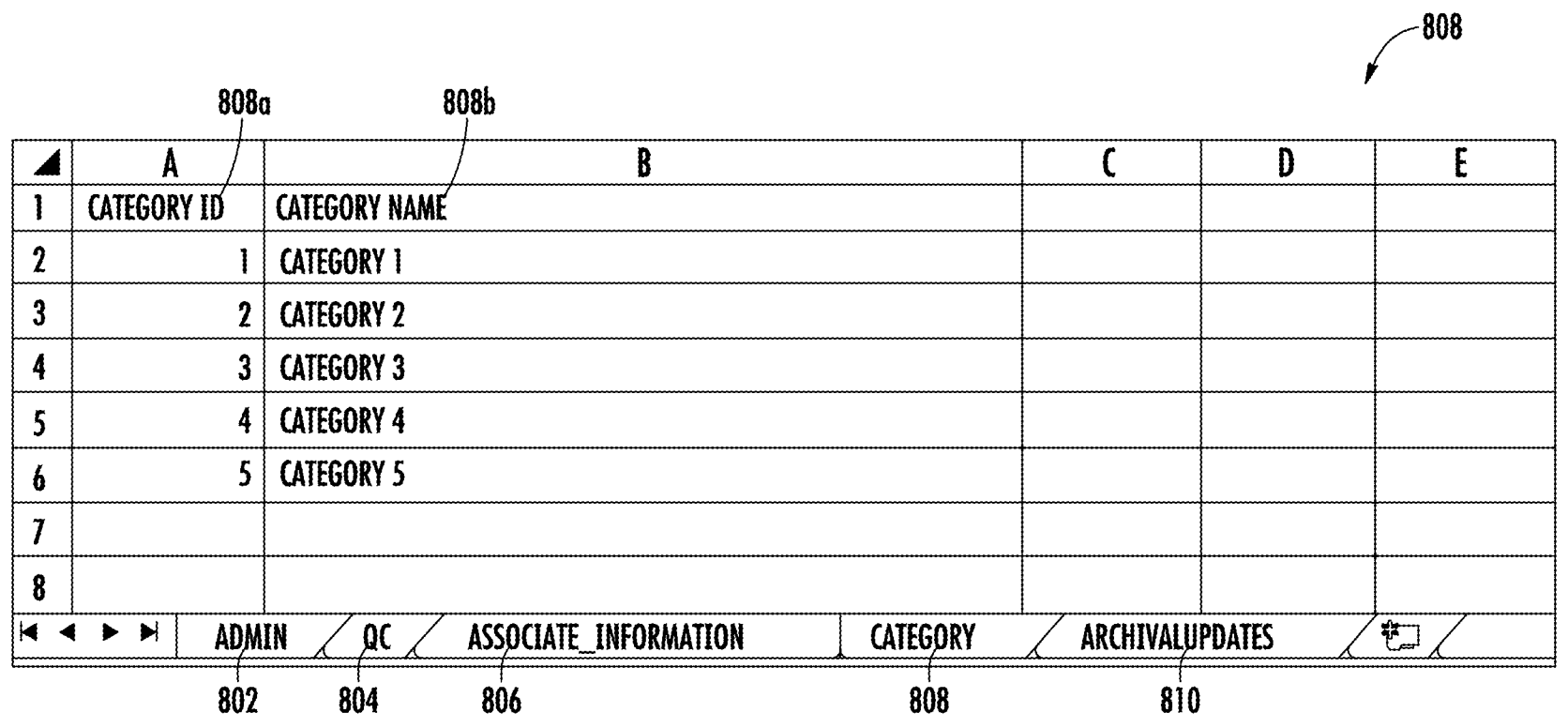

|   | A | B | C | D | E |
|---|---|---|---|---|---|
| 1 | CATEGORY ID | CATEGORY NAME | | | |
| 2 | 1 | CATEGORY 1 | | | |
| 3 | 2 | CATEGORY 2 | | | |
| 4 | 3 | CATEGORY 3 | | | |
| 5 | 4 | CATEGORY 4 | | | |
| 6 | 5 | CATEGORY 5 | | | |
| 7 | | | | | |
| 8 | | | | | |

| ADMIN | QC | ASSOCIATE_INFORMATION | CATEGORY | ARCHIVAL UPDATES |

*FIG. 9*

SYSTEM FOR ALLOCATING A WORK REQUEST

BACKGROUND

There is a need to manage workflow requests and streamline the distribution of the requests to one or more users.

SUMMARY

In one aspect, the present invention is directed to a system for allocating a work request, the system comprising: a processor; a memory; a module stored in memory executable by a processor, and configured to: initiate the presentation of a first user interface to enable a first user to: receive a work request received from a source, wherein the work request comprises an objective and a priority level; assign a category to the work request based on at least the objective and the priority level associated with the work request; and allocate the work request to a second user based on at least the category associated with the work request; transmit the allocated work request to the second user; initiate the presentation of a second user interface to enable a second user to: retrieve the work request, wherein the work request comprises a status; and process the work request, wherein processing the work request further comprises addressing the work request based on at least the status and the priority level associated with the work request; and transmit the processed work request to third user for a quality assessment.

In some embodiments, the module is configured to initiate the presentation of the first user interface to the first user based on at least an authorization of an allocator level authentication credentials.

In some embodiments, the module is configured to initiate the presentation of the second user interface to the second user based on at least an authorization of an associate level authentication credentials.

In some embodiments, the work request comprises a unique identification number.

In some embodiments, the module enables the work request to be sortable based on at least the priority level associated with the work request.

In some embodiments, assigning the category further comprises selecting the category from a drop down list, wherein the category is predefined and customizable.

In some embodiments, wherein the second user interface enables the second user to realign the work request, wherein realigning the work request comprises transmitting the work request to a fourth user, wherein the fourth user has the associate level authentication credentials.

In some embodiments, wherein the second user interface enables the second user to track the realignment.

In some embodiments, wherein the second user interface enables the second user to change the category associated with the work request prior to transmission of the work request to the fourth user.

In some embodiments, wherein the second user interface enables the second user to append comments with the work request prior to the transmission of the work request to the fourth user.

In some embodiments, the second user interface initiates the presentation of a notification, wherein the notification is an indication that the work request has been allocated to the second user manually, independent of the system.

In some embodiments, the second user interface enables the second user to synchronize the work request allocated manually with the work request allocated using the system, wherein the work request allocated manually is assigned a unique identification number after synchronization.

In some embodiments, the first user interface further comprises a selected mailbox, wherein the selected mailbox comprises the work request selected by the first user to be allocated to the second user.

In some embodiments, allocating the work request further comprises allocating the work request to the second user based on at least a skill level of the second user.

In some embodiments, allocating the work request to the second user further comprises selecting the second user from a drop down list.

In some embodiments, user interface further comprises a submit option to execute the allocation of the work request to the associate.

In some embodiments, transmitting the work request to the second user comprises sending a notification, wherein sending a notification comprises sending an email, a text message, or a pop-up message.

In some embodiments, the first user interface further comprises a select and deselect option, wherein the select option enables the first user to select at least one work request to be allocated to the second user, wherein the deselect option enables the first user to deselect at least one work request selected to be allocated to the second user.

In one aspect, the present invention is directed to a method for allocating a work request, the method comprising: initiating the presentation of a first user interface to enable a first user to: receive a work request received from a source, wherein the work request comprises an objective and a priority level; assign a category to the work request based on at least the objective and the priority level associated with the work request; and allocate the work request to a second user based on at least the category associated with the work request; transmitting the allocated work request to the second user; initiating the presentation of a second user interface to enable a second user to: retrieve the work request, wherein the work request comprises a status; and process the work request, wherein processing the work request further comprises addressing the work request based on at least the status and the priority level associated with the work request; and transmitting the processed work request to third user for a quality assessment.

In one aspect, the present invention is directed to a computer program product for a system for allocating a work request, the computer program product comprising a non-transitory computer-readable medium comprising code causing a first apparatus to: initiate the presentation of a first user interface to enable a first user to: receive a work request received from a source, wherein the work request comprises an objective and a priority level; assign a category to the work request based on at least the objective and the priority level associated with the work request; and allocate the work request to a second user based on at least the category associated with the work request; transmit the allocated work request to the second user; initiate the presentation of a second user interface to enable a second user to: retrieve the work request, wherein the work request comprises a status; and process the work request, wherein processing the work request further comprises addressing the work request based on at least the status and the priority level associated with the work request; and transmit the processed work request to third user for a quality assessment.

BRIEF DESCRIPTION OF THE DRAWINGS

Figure 1:
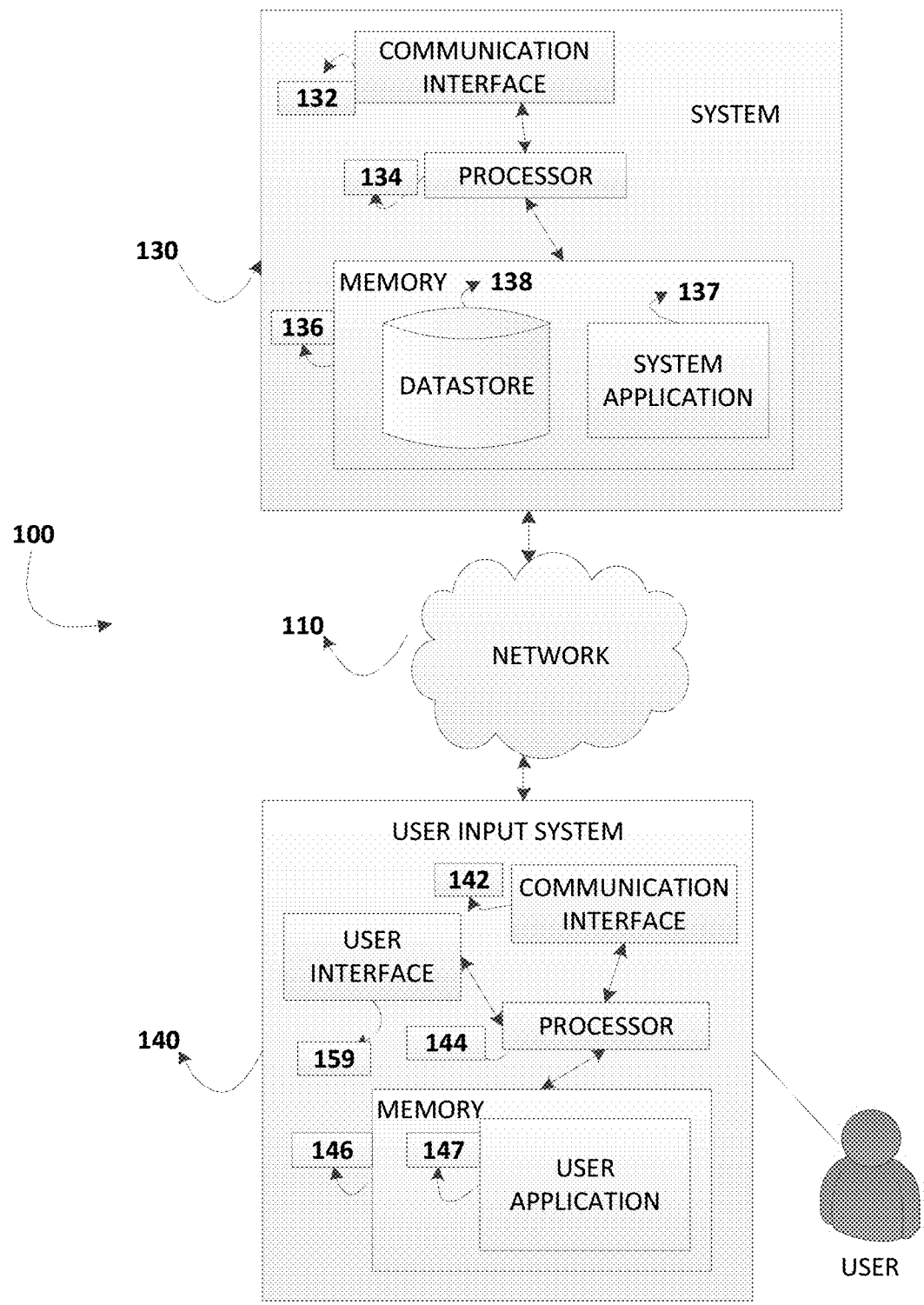

Having thus described embodiments of the invention in general terms, reference will now be made to accompanying drawings, where:

FIG. 1 presents an exemplary block diagram of the system environment.

Figure 2:
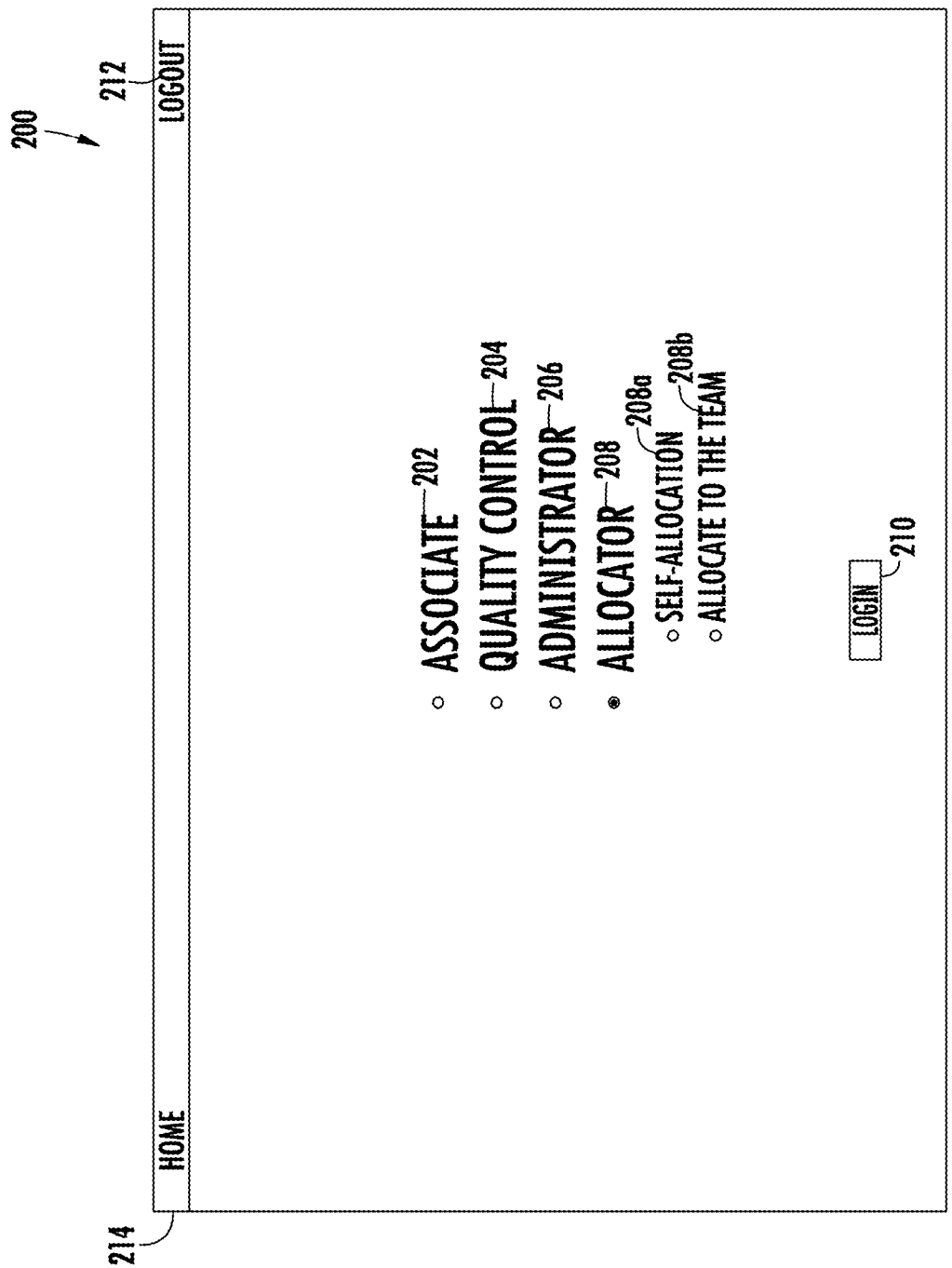

FIG. 2 illustrates a first user interface associated with the workflow management system.

Figure 3:
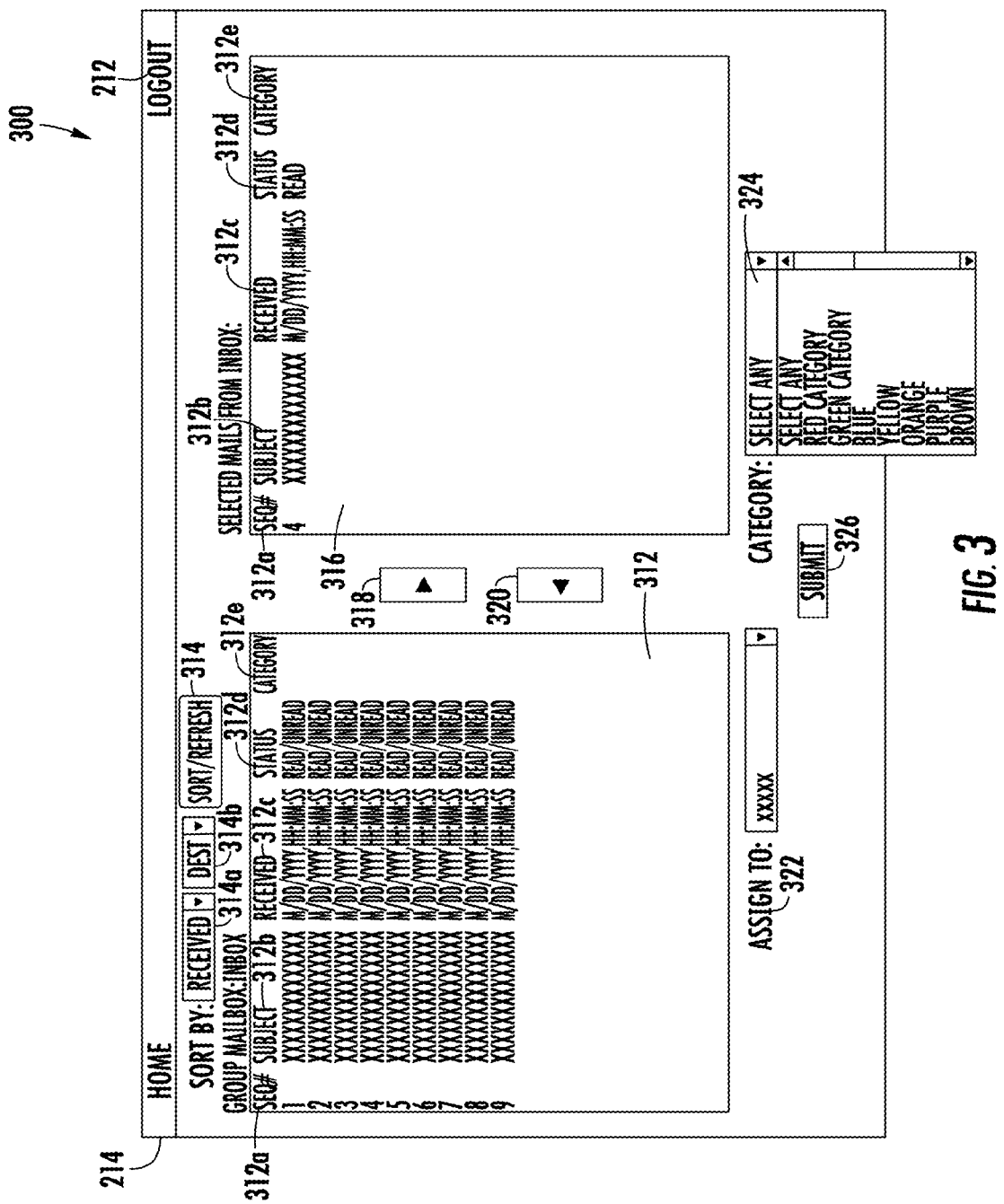

FIG. 3 illustrates a second user interface of the workflow management system.

Figure 4:
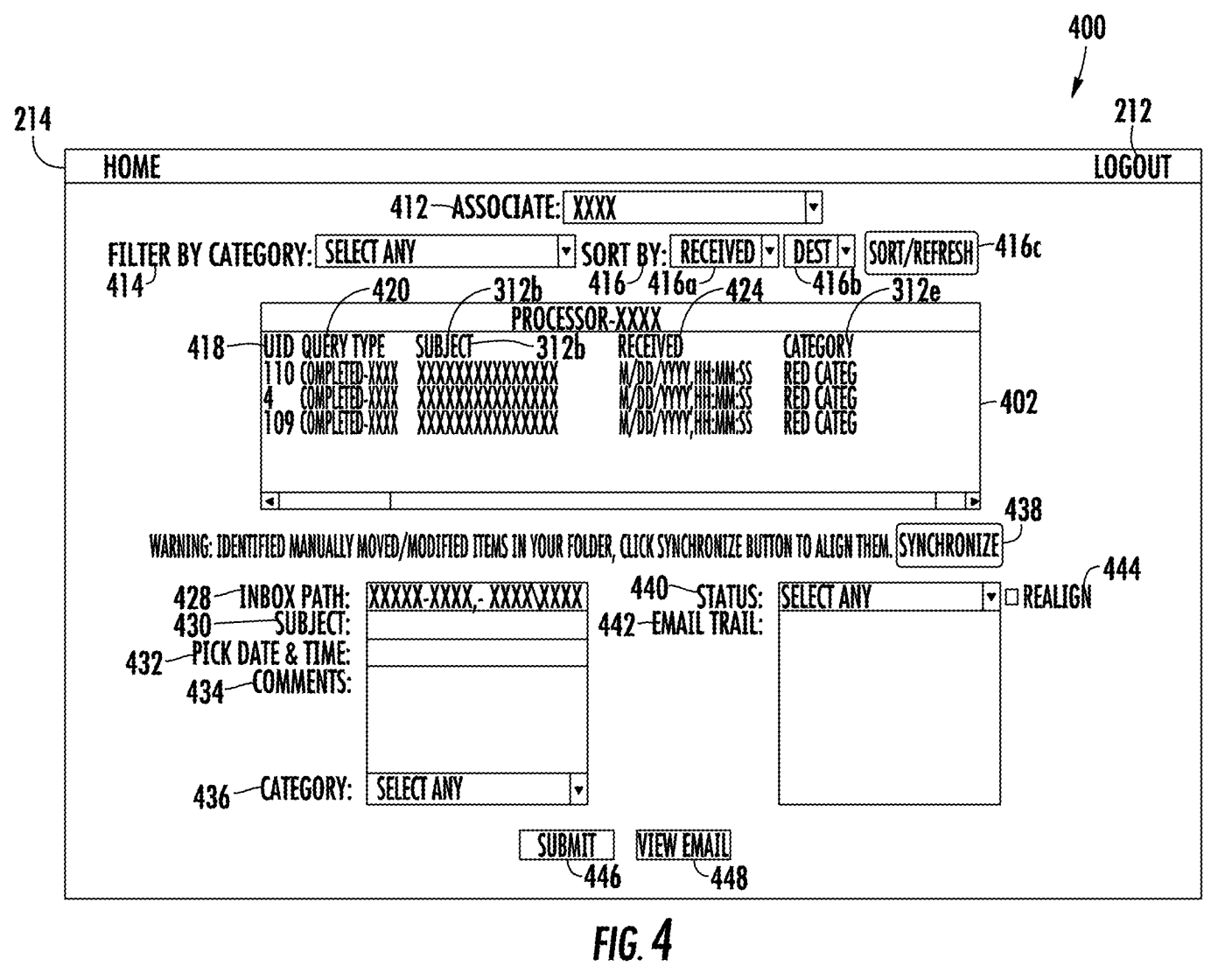

FIG. 4 illustrates a third user interface for a workflow management system.

Figure 5:
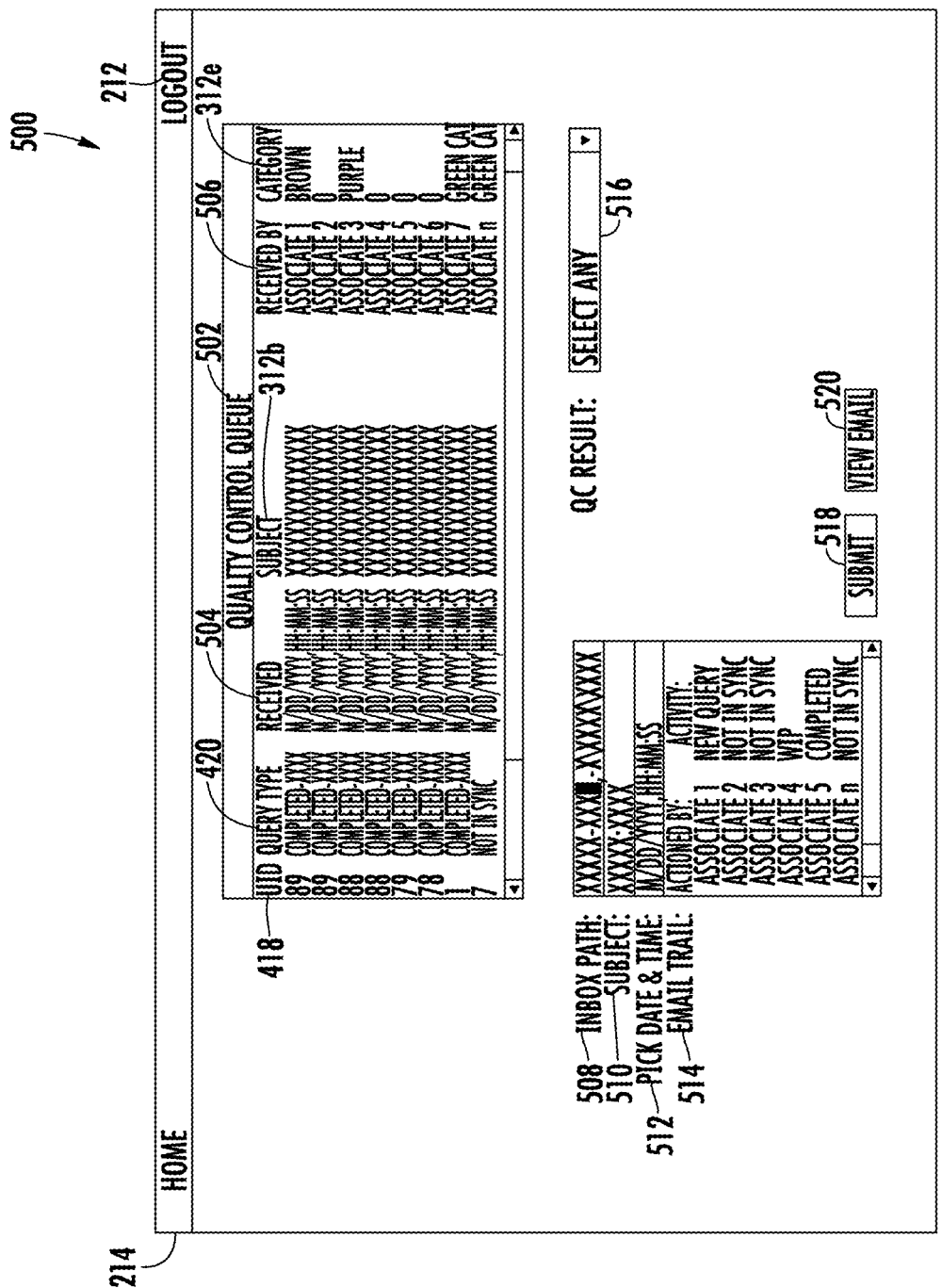

FIG. 5 illustrates a fourth user interface of the workflow management system.

FIG. 6 illustrates an exemplary embodiment of the status report.

Figure 7:
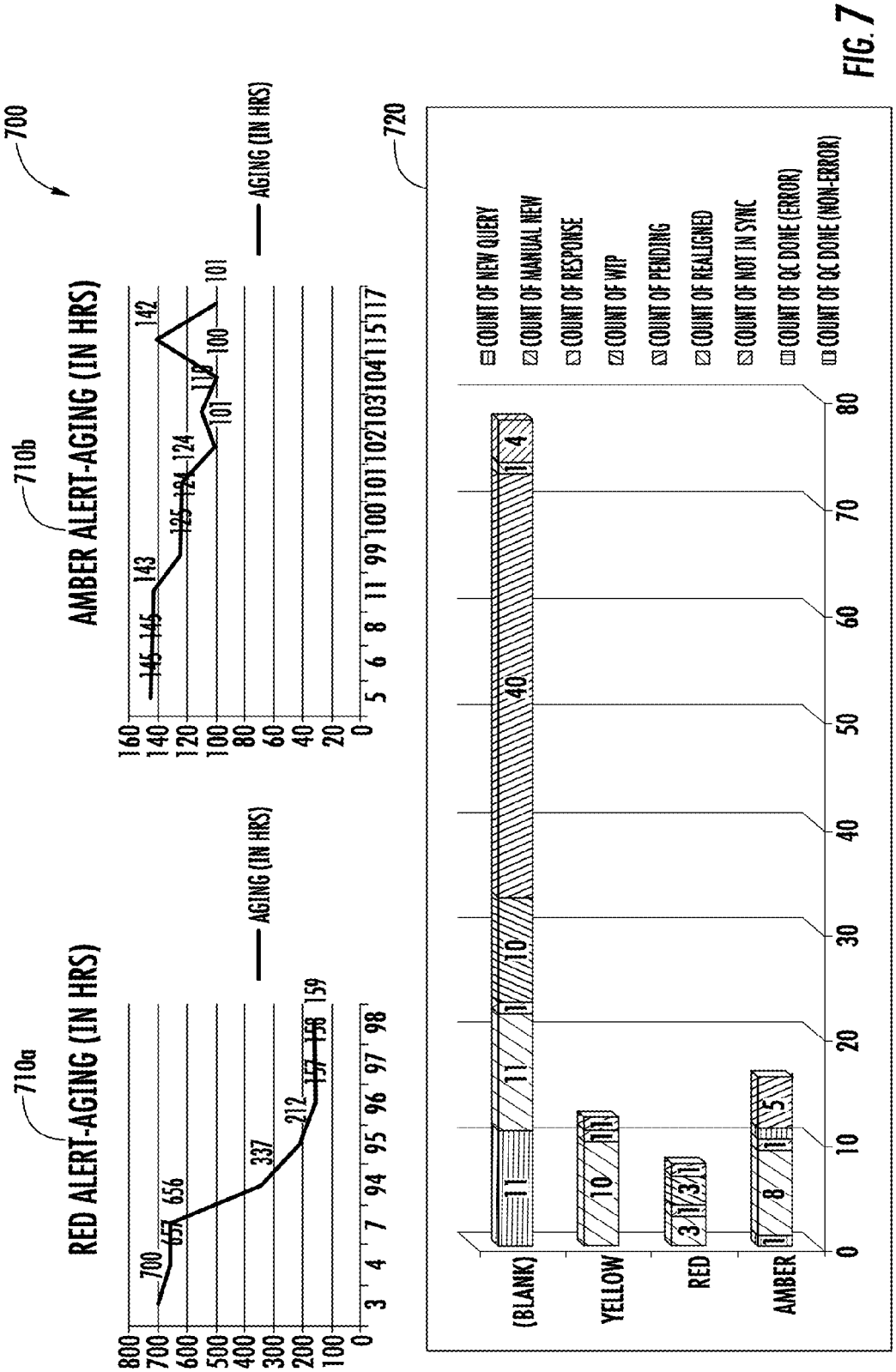

FIG. 7 illustrates exemplary embodiments of the graphical representation of the reporting feature.

Figure 8:
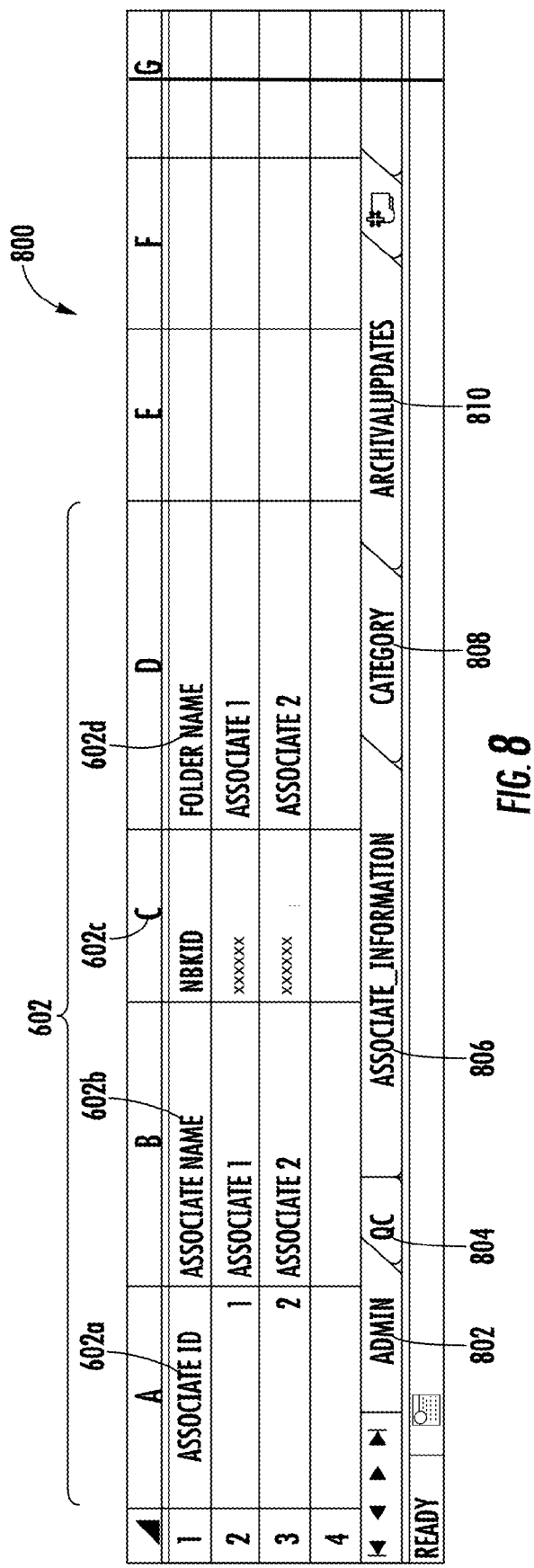

FIG. 8 illustrates an exemplary embodiment of an administrator interface to add, modify, and delete associate information.

FIG. 9 illustrates an exemplary embodiment of the category access page.

Figure 10:
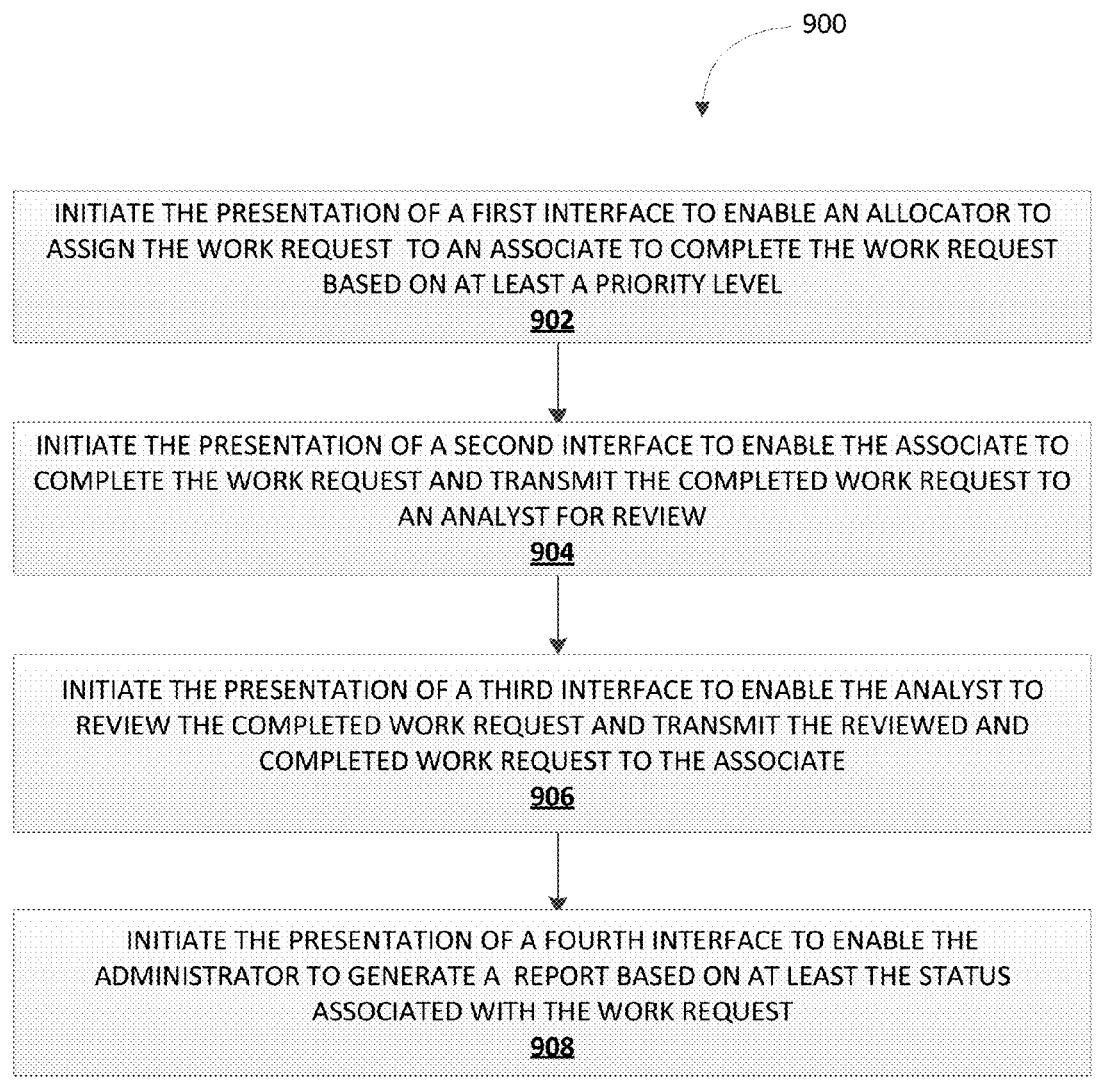

FIG. 10 illustrates a process flow for handling work requests.

Figure 11:
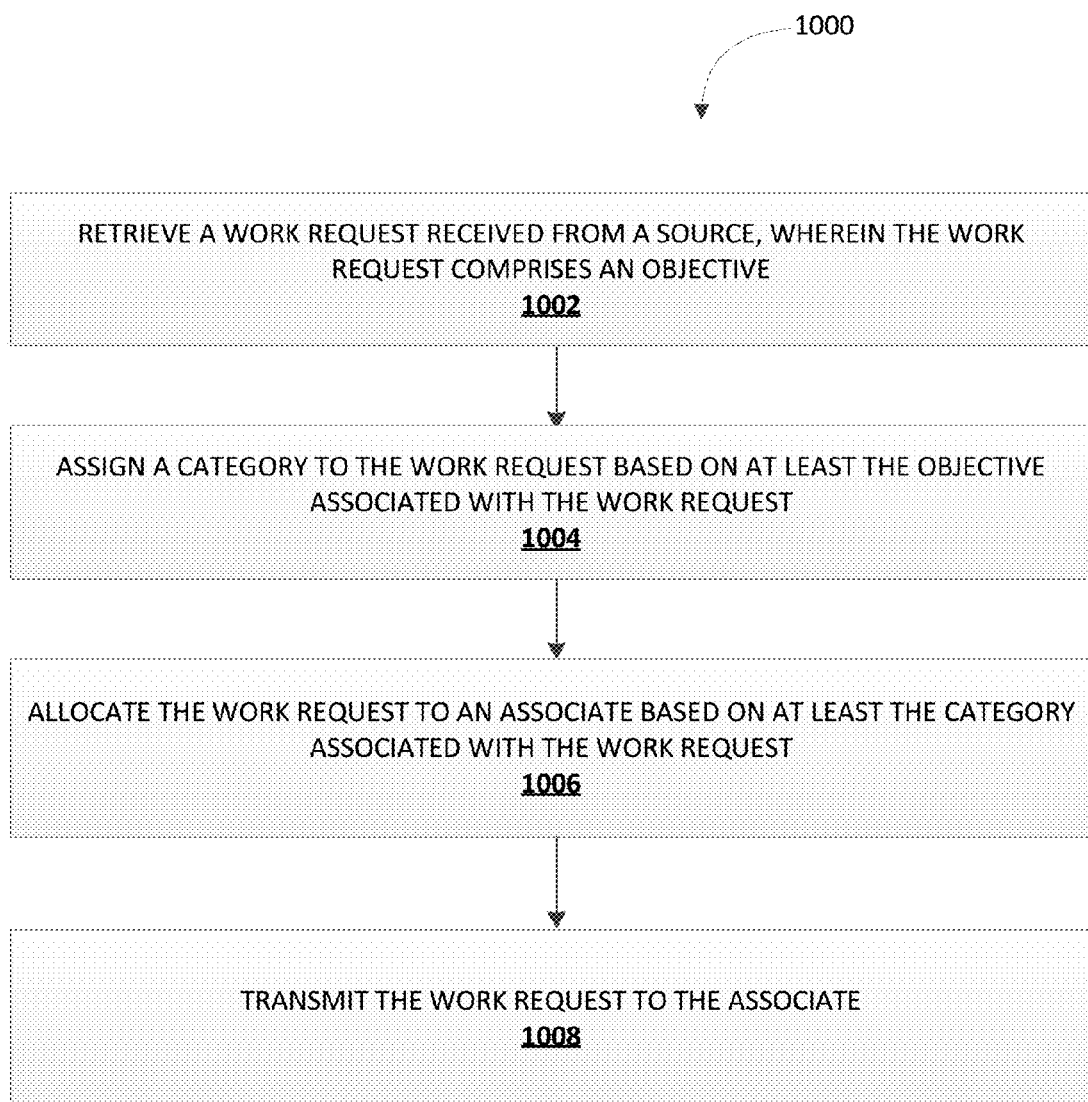

FIG. 11 illustrates a process flow for allocating a work request.

Figure 12:
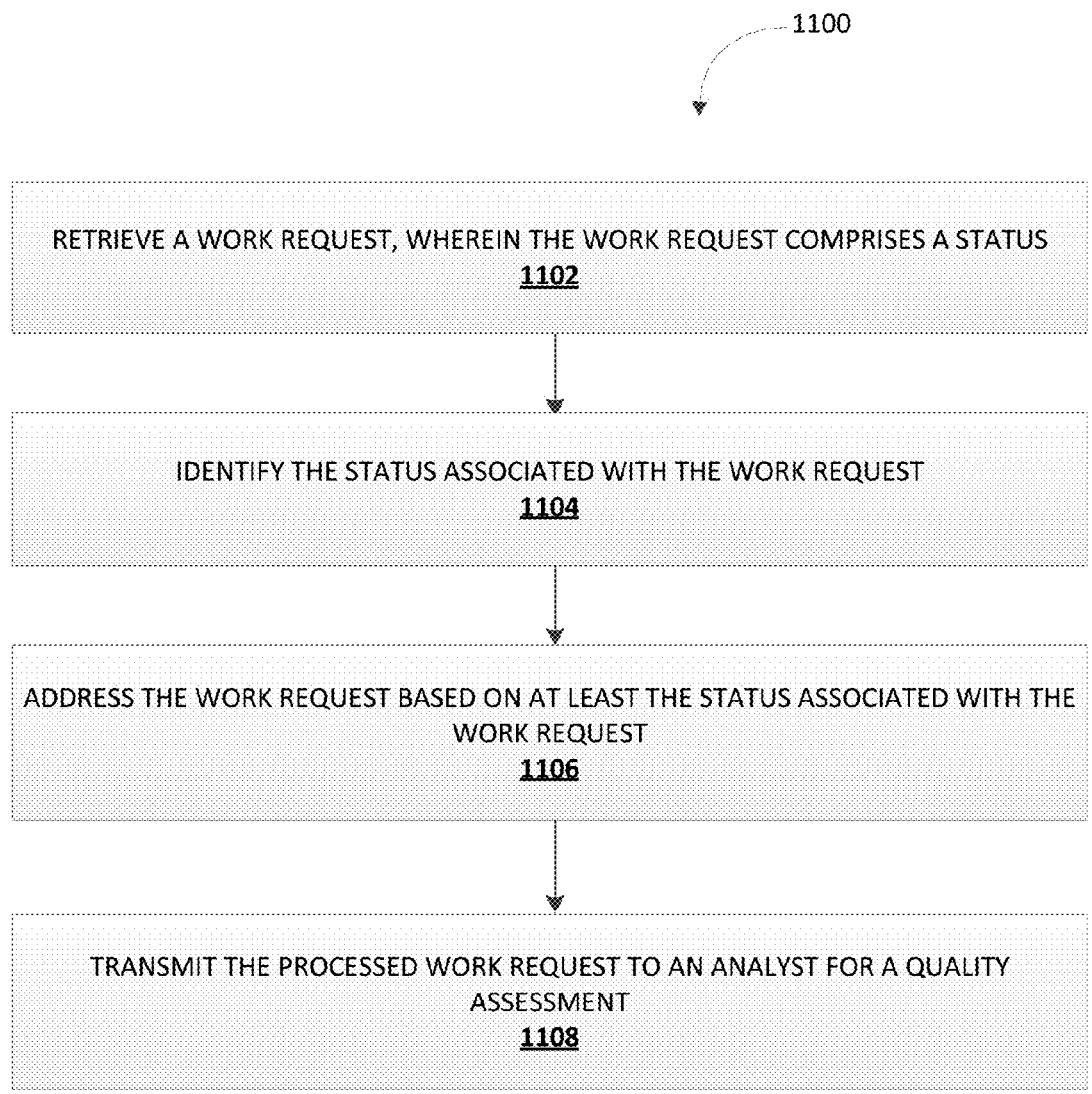

FIG. 12 illustrates a process flow for processing a work request.

Figure 13:
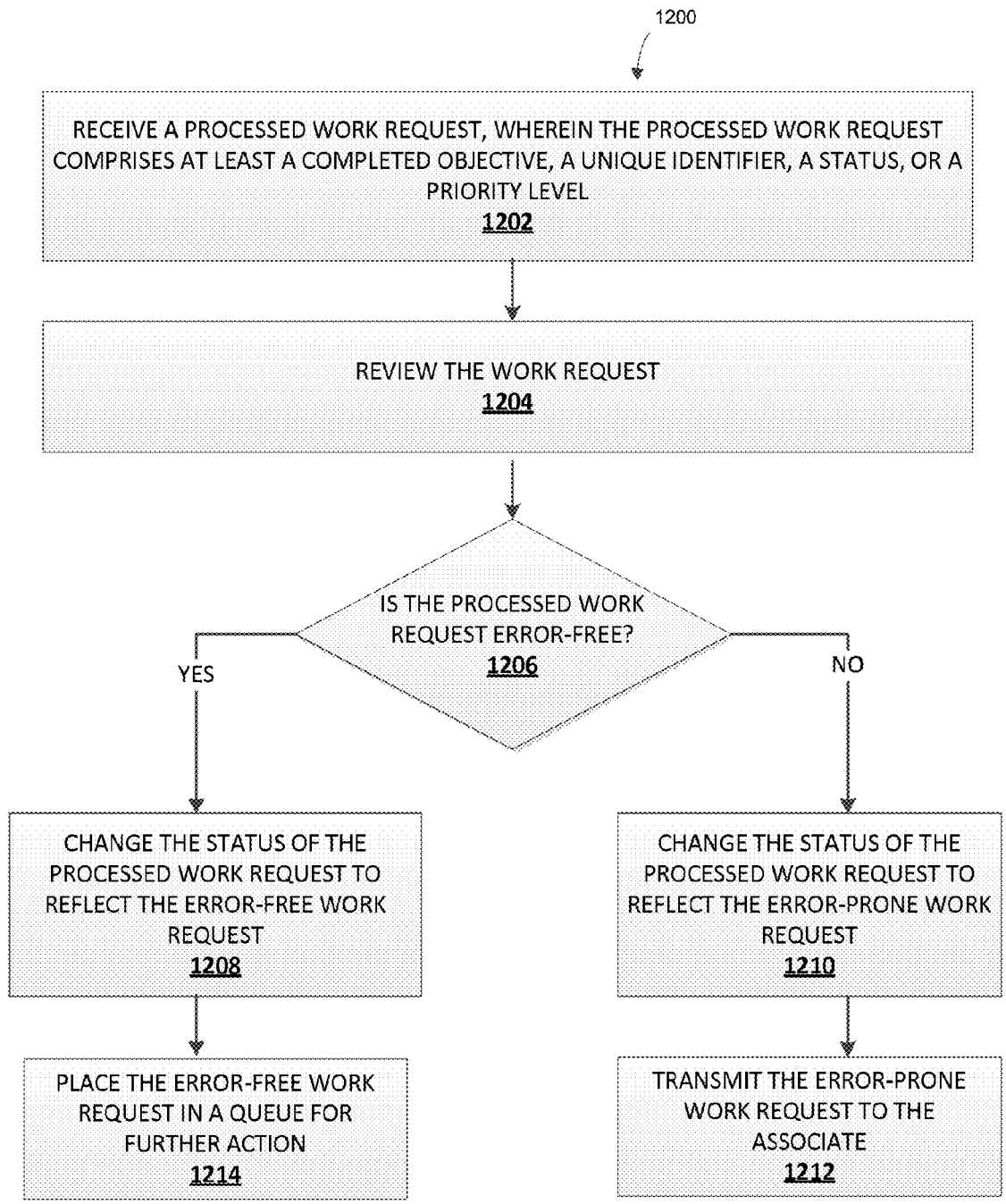

FIG. 13 illustrates a process flow for quality assessment of work requests.

Figure 14:
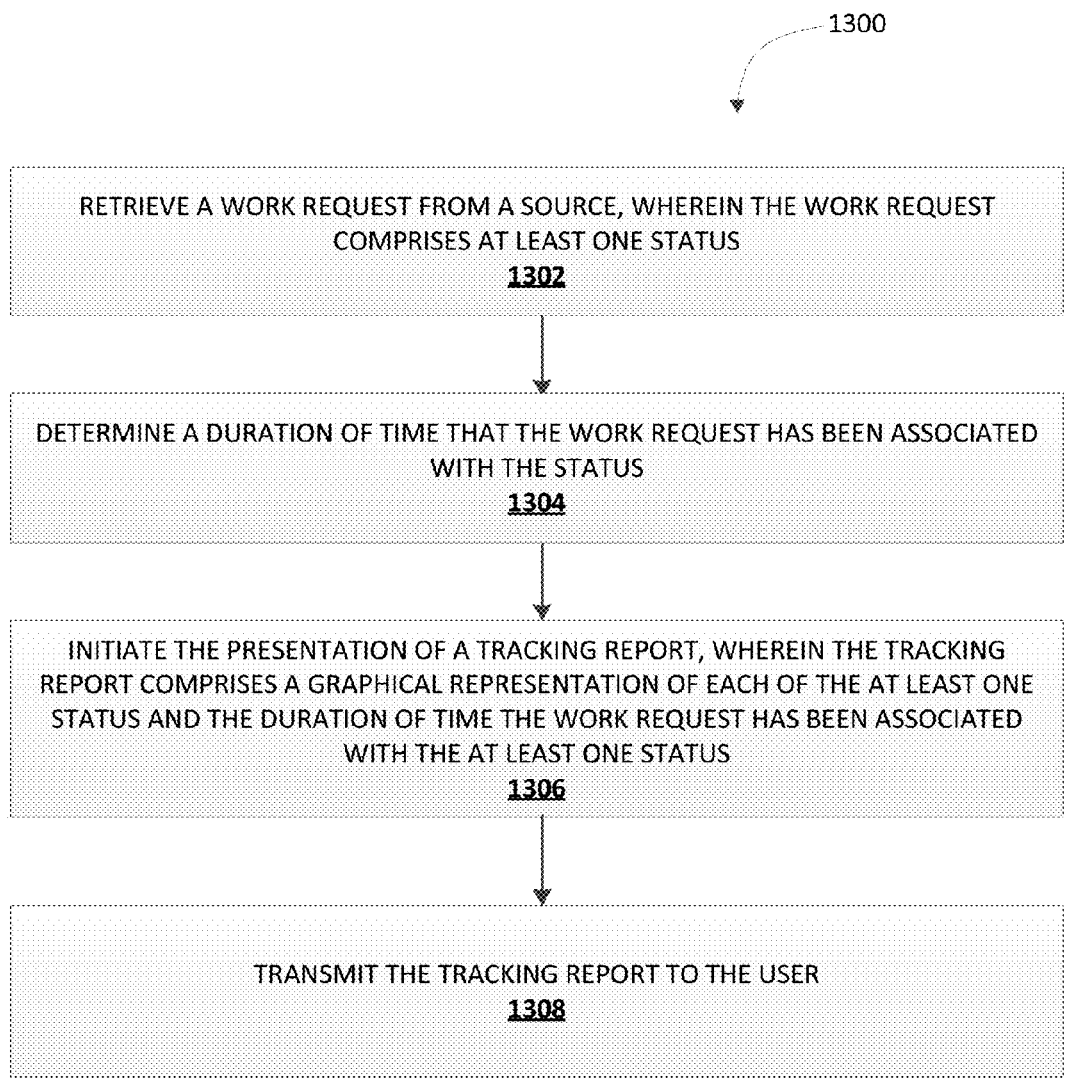

FIG. 14 illustrates a process flow for generating a tracking report.

Figure 15:
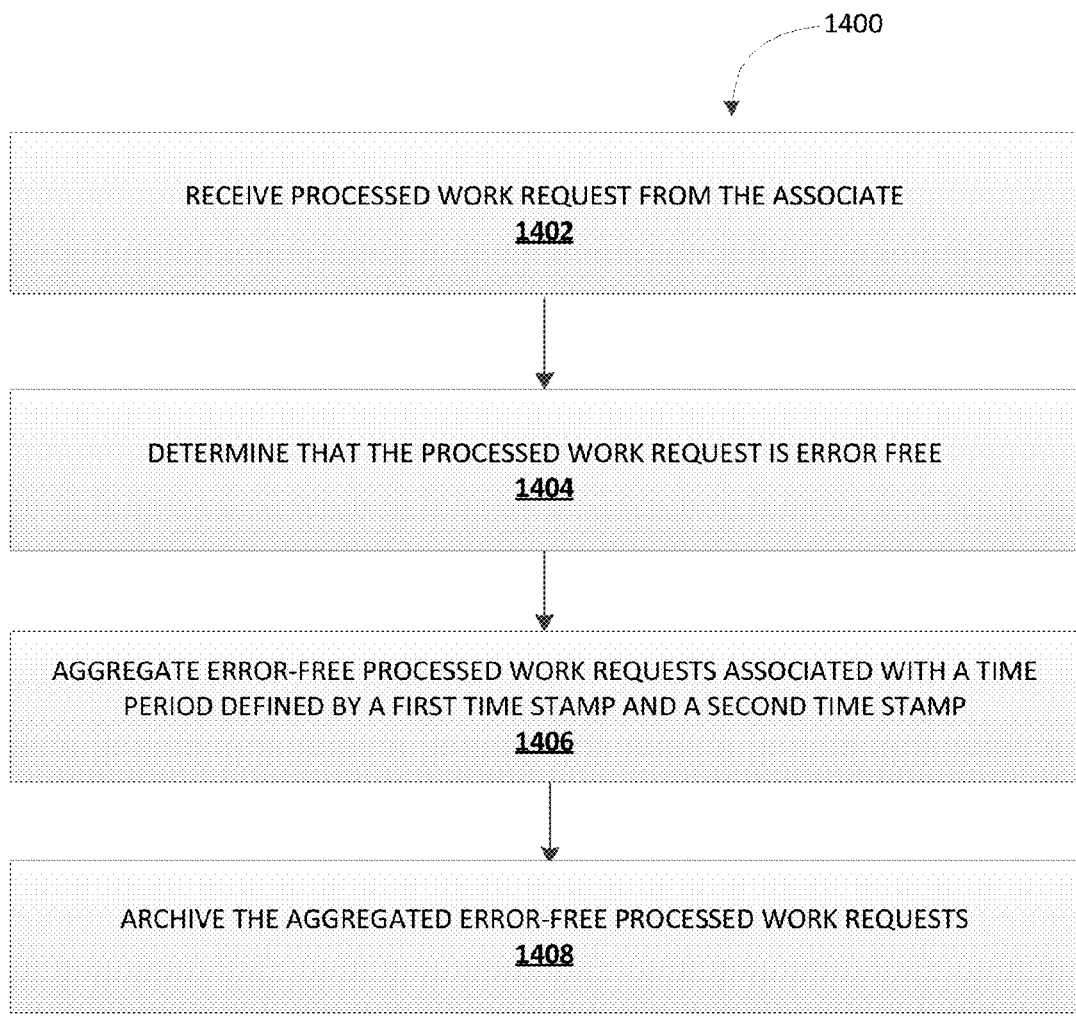

FIG. 15 illustrates a process flow for the archival process.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be any organization or enterprise that has a collective goal and is linked to an external environment. In some embodiments, an entity may be a business entity, a merchant, or corporation. In some other embodiments, an entity may be a financial institution. A "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, the "user" may be a user (e.g., an account holder or a person who has an account (e.g., banking account, credit account, or the like)), an employee (e.g., an underwriter, a project manager, an IT specialist, a manager, an administrator, an internal operations analyst, or the like). In another embodiment, the user may refer to an individual within a group.

As user herein, an "allocator" may be a user with an allocator level of access. As used herein, an "analyst" may be a user with proper authentication to perform quality control. As user herein, an "administrator" may be a user with an administrator level of access. As used herein, an "associate" may be a user with an associate level of access to retrieve one or more work requests.

A business process or business method is a collection of related, structured activities or tasks that produce a specific service or product. Typically, a business process can be decomposed into several sub-processes which have their own attributes, but also contribute to achieving the goal of the overall process. Typically, one or more objectives associated with the business process are received in the form of work requests. As used herein, a "work request" may refer to any request that may require action by a user.

In some embodiments, these work requests may be received in the form of emails, work orders, service requests, automated forms, personal communication, or the like. For purposes of the invention, the work requests are considered received in the form of emails. It will be understood that the workflow management system as explained herein may be applicable to other forms of electronic and non-electronic means of communication of work requests.

In some embodiments, one or more internal operations groups may be involved in a business process. In such situations, one or more work requests may be exchanged between the one or more internal operations groups. In some other embodiments, the one or more work requests may be sent by an external entity. As used herein, a "source" may refer to origin of the work request and a "target" may refer to the destination of the work request. In one aspect, the target may receive one or more work requests from one or more sources. In some embodiments, the source may be an email exchange server, an enterprise server, or the like.

A work request received from the source is generally allocated to one or more users at the destination based on factors such as the qualification of the user, the time duration associated with the work request, the priority level, and/or the like. Typically, these requests are manually allocated to the users in the internal operations groups causing an increase in the turnaround time. Turnaround time refers to the total time taken between the submission of a work request for execution and the return of the completed output to the source. In some embodiments, the rate at which the target receives the one or more work requests may be more than the rate at which the target processes the received requests. In such situations, the one or more work requests may be entered into a queue and processed accordingly. Manual allocation of the one or more work requests may increase the wait time of the one or more work requests in the queue.

In some embodiments, the one or more work requests may have one or more follow up requests. In such situations, the user may have to manually cross-check each allocated work request and assign the follow up request accordingly. For example, after the allocation of a work request to a user, the user may have one or more queries regarding the request. In such situations, the user may send an email to the source with the query for clarification. In response to the email, the source may send a response. In one aspect, the source may take one or more days to respond to the query. In such situations, the target may have to follow up with the source for an adequate response to the query until the query is addressed. In one aspect, the source may have responded to the query but the target may have missed the response among numerous other work requests. In one aspect, based on the query, the source may append a follow-up request to the existing work request. Manual allocation and processing of such request renders the follow-up process to be laborious and time consuming, causing a delay in the turnaround time.

In some embodiments, the source may send one or more queries to the target after sending a work request and before the execution of the work request by the target. In some embodiments, the queries may be an update, a change in the requirement, an action associated with reviewing/revising the work request, or the like. In one aspect, each query may be associated with a priority level. Manual processing of such queries may be prone to human error and may result in missed email queries.

The present invention is directed to a workflow management system capable of automated processing of one or more requests received based on several built-in features such as such as allocation, synchronization, administration, quality control, reporting, archiving, and/or the like. With these features the user can track the various channels/phases a particular work request has gone through, receive alerts, see completed requests and identify processing errors, if any. In addition, the user may use these features to process the errors and generate robust reports which tracks and captures data across all feature points.

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application

147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the entity. The system 130 may be located at the facility associated with the entity or remotely from the facility associated with the entity. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 3 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

The workflow management system may include one or more levels of access based on the processing requirement of the one or more work requests. In some embodiments, each user in an internal processing group may have individual levels of access. In some other embodiments, a user in an internal processing group may have one or more levels of access. In alternative embodiments, a user in an internal processing group may not have a level of access. The one or more levels of access as explained herein include allocator, associate, quality control, and administrator. A user may sign-in with proper access credentials into one or more levels of access.

FIG. 2 illustrates a primary user interface associated with the workflow management system 200. In one aspect, the first user interface 200 is a sign-in page. As illustrated in FIG. 2, the primary user interface 200 includes one or more levels of access such as associate 202, quality control 204, administrator 206, and allocator 208. In one aspect, the allocator 208 option includes a self-allocation 208*a* option and an allocate to the team 208*b* option. The user may gain access with proper authentication credentials and logging on with the log in button 210. In some embodiments, the primary user interface 200 includes a home 214 option and a log-out 212 option. In one aspect, the home 214 option may enable the user to return to the sign in page to gain access to any one of the associate 202, quality control 204, administrator 206, and/or allocator 208 options with proper authentication credentials. In another aspect, the log-out 212 option may enable the user to successfully sign off for security purposes.

In some embodiments, a user with proper authentication credentials may assign one or more work requests to one or more users using the allocator 208 option. In some embodiments, the system may be configured to track the one or more actions performed by the user (allocator). In one aspect, the system may be configured to track who assigned (allocator) a work request. In another aspect, the system may be configured to track what was assigned (work request). In yet another aspect, the system may be configured to track who was assigned (associate) the work request. In this way, the allocation feature helps maintain a streamlined approach by integrating the information and making it accessible in one place.

In some embodiments, the allocator option 208 may include a self-allocation option 208a. The user with an allocator level of access may choose the self-allocation option 208a to assign one or more work requests to them. In some other embodiments, the allocator option 208 may include an allocate to the team option 208b. The user with an allocator level of access may choose the allocate to the team option 208b to assign one or more work requests to one or more users (associates) in an internal operations group/team. In one aspect, a user with both allocator level of access and an associate level of access may allocate the work request to themselves using the self-allocation 208a option.

In another embodiment, a user with proper authentication credentials may access one or more the assigned work requests using the associate option 202. With this level of access, each user (associate) may find the one or more assigned work requests and queries associated with the work requests in their respective queue. In this way, the associate may manage work requests on a daily basis with one or more features such as status queue, tracking, and/or the like as explained in further detail herein. In yet another embodiment, a user with proper authentication credentials may verify and track completed work requests/queries and identify processing errors, if any, using the quality control 204 option. In one aspect, the system may be configured to verify and track the status of the errors.

In yet another embodiment, a user with proper authentication credentials as an administrator, may have a privileged access to manage all of the various levels of access ensuring proper division of workflow and assignment with the administrator option 206. In one aspect, the administrator option 206 may enable a user to generate one or more reports using the reporting feature explained herein.

FIG. 3 illustrates a first user interface of the workflow management system 300. In one aspect, the first user interface 300 may be presented to a user with proper authentication credentials (allocator) to access the allocator option 208. In some embodiments, the first user interface 300 includes a group mailbox 312 associated with the internal operations group. In some embodiments, the one or more work requests are received at the target and stored in the group mailbox. The one or more work requests stored in the group mailbox include a serial number 312a, a subject 312b describing briefly the nature of the work request, received 312c, a status 312d, and/or a category 312e associated with the work request. In one aspect, the received 312c option may indicate a date and time 312c associated with the work request. In one aspect, the status 312d may be an indication of whether the work request in the group mailbox 312 has been addressed. In one aspect, addressing the work request may include assigning the work request to a user. In another aspect, addressing the work request may include responding to the email query. In some embodiments, the status 312d associated with the work request may be one of a read, unread, or the like.

As illustrated in FIG. 3, the first user interface of the workflow management system 300 includes a sorting option 314. In one aspect, the allocator may use the sorting option to determine the order in which the work requests are listed in the group mailbox 312. In some embodiments, the sorting option 314 may include a sort by option 314a and a description option 314b. The allocator may sort the work requests in the group mailbox 312 based on one or more sorting options such as a status 312d, a category 312e, a received date and time 312c, and/or a keyword in the subject 312b. In one aspect, the sorting option may be customizable. For example, an allocator may choose to assign work requests received from England, France, and Germany to a specific associate. In such situations, the allocator may obtain administrator level authentication credentials and create a sorting option which sorts the work requests based on the country of origin as a category 312e. As illustrated in FIG. 3, the first user interface 300 includes a home 214 option and a log-out 212 option. In one aspect, the home 214 option may enable the user to return to the sign in page to gain access to any one of the associate 202, quality control 204, administrator 206, and/or allocator 208 options with proper authentication credentials. In another aspect, the log-out 212 option may enable the user to successfully sign off for security purposes.

The first interface of the workflow management system 300 enables an allocator to select one or more work requests using the select option 318 and be placed in the selected mailbox 316. In response to selecting the one or more work requests, the allocator may then assign the one or more selected work requests to one or more associates in the internal processing group. In one aspect, the allocator may use the deselect option 320 to deselect the one or more work requests from the selected mailbox 316 and be placed back in the group mailbox 312.

Once the one or more work requests are selected, the allocator may then use the assign to option 322 to assign the one or more selected work requests to an associate in the internal processing group. In some embodiments, the assign to option 322 may include a list of associates in the internal processing group in the form of a drop-down list. In some embodiments, the first user interface 200 may include a category option 324. The allocator may use the category option 324 to append the one or more work requests with a category when assigning the one or more work requests to the user. In one aspect, the category option 324 may include a list of categories in the form of a drop-down list. In some embodiments, the one or more category options may be based on a priority level. In another embodiment, the system may be configured to enable the allocator to choose a category from the category option 324 to be associated with one or more work requests, which may be reflected in the category 312e in the group mail box 312 and the 312e in the selected mailbox 316. In some other embodiments, the one or more category options may be customizable by the allocator. Once the allocator selects the one or more work requests from the group mailbox, determines a user to assign the work requests to, and appends a category, the allocator may use the submit option 326 to execute the allocation.

FIG. 4 illustrates a second user interface for a workflow management system 400. In one aspect, the second user interface 400 may be presented to a user with proper authentication credentials (associate) to access the associate option 202. In one aspect, the associate is a part of the internal operations group. In some embodiments, the second user interface 400 includes an associate mailbox 402. In one aspect, the one or more work requests are associated with a query type 420, wherein the query-type 420 may include a status associated with the work request such as new, WIP (work in progress), pending, response, completed, not in sync, quality control done (error), and/or quality control done (no error).

Each work request is associated with a query type based on a progress level. For example, a work request is associated with "new" query type when an associate receives a new work request. In response to receiving a new work request, the associate may open the work request and begin working on the request during which the system may be configured to enable the user to change the query type to "WIP (work in progress)". When working on a request, an associate may have one or more queries. In such situations, the associate may send a query back to the source during which the system may enable the user to change the query type to "pending". When the source responds the query, the response can be accessed by the associate from the associate mailbox 402 during which the system may be configured to enable the user to change the query type to "response". Once the work request is completed by the associate, the completed request is transferred to quality control for verification and review during which the system may be configured to enable the user to change the query type to "completed". In response to receiving the completed work request, quality control may review and verify the work output and send a response back to the associate. If no errors were found in the completed work request, the system may be configured to enable the user to change the query type to "quality control done (no error)" and in case of errors, the system may be configured to enable the user to change the query type to "quality control done (errors)". In some embodiments, a work request may be associated with a "not in sync" query type if the work request has been assigned to an associate independently from the workflow management system. The associate may take action on a work request based on at least a query type associated with the work request.

In one aspect, the associate mailbox 402 includes a received option 424, wherein the received option 424 includes a date and time associated with when the work request is received in the associate mailbox 402. In another aspect, the associate mailbox 402 includes a unique identification number (UID) 418. Typically, a UID 418 is generated when a work request is allocated to an associate. Any and all responses and queries associated with the work request may be associated with the UID 418 initially assigned to the work request. In this way, the UID 418 may be used to track the work requests by uniquely identifying each work request. In another aspect, the associate mailbox 402 includes a category option 312*e*. In some embodiments, the category option 312*e* is an indication of the category assigned by the allocator in the first user interface 300 when assigning a work request to an associate. In some embodiments, a category may be associated with a work request to provide flexibility to sort the work requests based on a priority/complexity. In one aspect, one or more categories may be customizable by a user with an administrator level access. In yet another embodiment, the associate mailbox 402 includes a sorting option 416. An associate may choose to sort the one or more work requests in the associate mailbox 402 based on at least one or more options such a received data and time 424, a category 312*e*, a subject 312*b*, a UID 418, a query type 420, or the like, available under 416*a*. In one aspect, the one or more options may be listed in the form of a drop-down box. In addition, an associate may choose to sort the one or more work requests in the associate mailbox 402 based on a description 416*b* associated with a work request.

In one aspect, the associate mailbox 402 includes a drop-down list of associates 412. An associate may choose his/her name from the dropdown list to receive one or more work requests assigned to the associate by an allocator. In another aspect, the associate mailbox 402 includes a filtering option 414 which may enable an associate to filter the received work requests based on at least a category 312*e* associated with the work request. For example, an associate may want to work only on work requests received from a particular client. In such situations, the associate may filter the one or more work requests in the associate mailbox 402 based on a predefined category associated with the name of the client to receive one or more work requests from the client.

In some embodiments, the second user interface 400 includes a synchronize option 438. In one aspect, an associate may use the synchronization option 438 to integrate the work requests received by an associate through the workflow management system and independent of the workflow management system with the work requests received through the workflow management for efficient tracking and verification. In such situations, the synchronization option 438 may be used to identify gaps and mismatches in the mailbox to consolidate work requests which have been manually allocated to an associate independent of the workflow management system. In one aspect, the system may be configured to initiate an alert when the one or more work requests are misaligned. In some embodiments, a misalignment may be a result of an unintentional change in the category associated with the work request. In some other embodiments, a misalignment may be a result of unintentionally moving one or more work requests into a sub-folder manually. In one aspect, when the synchronization option 438 is executed, one or more misaligned work requests may be associated with at least one of a "not in sync" query type and/or a "manual-new" query type.

In some embodiments, the second user interface 400 includes a realign option 444. Typically, the realign option 444 may be used to transfer one or more work requests to another associate. In some embodiments, the realign option 444 includes a status 440 and email trail 442. In one aspect, a work request may be erroneously assigned to an associate by an allocator. In another aspect, a work request assigned to an associate may not be appropriate for the skillset of the associate. In yet another aspect, a work request may be incidentally/manually assigned to an associate. In such situations, the associate may use the realign option 444 to rectify the one or more work requests and reassign the one or more work requests to one or more other associates during which the system may be configured to enable the associate to change the status 440 to indicate "assigned to". In one aspect, the associate with one or more inappropriate work requests may reassign the one or more work requests to another associate using the second user interface 400. In some embodiments, the second user interface 400 includes an inbox path 428, a subject 430, a date and time 432, a comments section 434, and a category 436. An associate may reassign the one or more work requests to another associate, use the comments section 434 to explain the reason for the reassignment, use the category section 436 to append a category to the one or more work requests, and use an inbox path 428 to determine one or more work request recipients. In addition, the associate may execute the options by clicking on the submit button 446. In one aspect, the associate may view the email before reassigning the work request using the view email option 448. As illustrated in FIG. 4, the second user interface 400 includes a home 214 option and a log-out 212 option. In one aspect, the home 214 option may enable the user to return to the sign in page to gain access to any one of the associate 202, quality control 204, administrator 206, and/or allocator 208 options with proper authentication credentials. In another aspect, the log-out 212 option may enable the user to successfully sign off for security purposes.

FIG. 5 illustrates a third user interface of the workflow management system 500. In one aspect, the third user interface 500 may be used by a user with the proper authentication credentials for quality control (analyst). In some embodiments, the third user interface 500 includes a quality control queue 502. In one aspect, the quality control queue 502 includes a UID 418 associated with the work request, a query type 420, a subject 312*b*, a received by option 506, and a category 312*e*. Typically, the quality control queue 502 includes one or more completed work requests as received from one or more associates for review and verification. In one aspect, the query type 420 is an indication of the work request completed by a particular associate. In one aspect, the received by option 506 indicates the name of the associate who received the completed work request for review and verification.

As illustrated in FIG. 5, the third user interface of the workflow management system 500 includes a QC (quality control) result option 516 in the form of the drop down list enabling the analyst to indicate whether the completed work request has passed review and verification. The analyst may review the completed work request, assign a QC result using the QC result option 516, and send a response back to the associate. In one aspect, the response may include a query type "QC done (errors)" if the completed work request is erroneous, or "QC done (no errors)" if the completed work request is non-erroneous. In another aspect, the response may be sent to the associate using an inbox path 508, a subject 510, and a date and time 512. In yet another aspect, one or more communications transmitted between one or more associates within one or more internal operational groups may be recorded and tracked using the email trail option 514. In one aspect, the analyst may execute the one or more responses by clicking on the submit option 518. In another aspect, the analyst may review the email by using the view email option 520. In another aspect, the analyst may enter one or more comments associated with the completed work request after quality control. As illustrated in FIG. 5, the third user interface 500 includes a home 214 option and a log-out 212 option. In one aspect, the home 214 option may enable the user to return to the sign in page to gain access to any one of the associate 202, quality control 204, administrator 206, and/or allocator 208 options with proper authentication credentials. In another aspect, the log-out 212 option may enable the user to successfully sign off for security purposes.

FIG. 6 illustrates an exemplary embodiment of the status report 600. In one aspect, the fourth user interface 600 may be used by a user to with the proper authentication credentials to generate one or more reports to track the one or more work requests from the time it has been received to the time it has been completed. In some embodiments, the status report as illustrated in FIG. 6 may include a list of one or more associates 602, a query type 420, and a total count 604. In one aspect, the status report may be used to identify the one or more associates and the one or more work requests associated with each associate based on the query type 420 associated with each work request. For example, as illustrated in 6, associate 1 may have 3 work requests with "WIP" query type, 2 work requests with a "completed" query type, and 1 work request with a "pending" query type, with a total of 6 work requests. In another aspect, as illustrated in FIG. 6, the status report may be used to identify the one or more associates and the one or more work requests associated with each associate based on the category 312*e* associated with the one or more work requests. For example, as illustrated in 6, associate 1 may have 3 work requests with "category 1" and 3 work requests with "category 2".

In one aspect, the one or more reports may be an aging report. Typically, an aging report is a report showing how long one or more work requests received from one or more users have been outstanding. In addition, the one or more reports may be sub-divided into one or more categories based on the length of the outstanding time. In one aspect, the one or more categories may be based on a priority level. In some embodiments, the priority level may be indicated by a color. For example, a red color may be assigned to one or more work requests with a length of outstanding time greater than a predetermined number of hours (say 200 hours) indicating that the one or more work requests require immediate attention, a green color may be assigned to one or more work requests wherein the length of outstanding time is within the normal processing time (say 100 hours), and an amber color may be assigned to one or more work requests wherein the length of outstanding time is greater than the normal processing time and lesser than the length of outstanding time that requires immediate attention indicating that the processing of one or more work requests has been delayed.

FIG. 7 illustrates exemplary embodiments of the graphical representation of the reporting feature 700. As illustrated, FIG. 7 includes an exemplary embodiment of a graph indicating one or more work requests with a priority level—red 710*a*. As illustrated, FIG. 7 includes an exemplary embodiment of a graph indicating one or more work requests with a priority level—amber 710*b*. As illustrated, FIG. 7 includes an exemplary embodiment of a graph indicating a priority level for one or more work requests in various stages of the work request process, 710*c*. For example, out of 15 work requests with a priority level—amber, 8 work requests may be associated with a "manual-new" query type, 5 work requests may be associated with a "not in sync" query type, 1 work request may be associated with a "pending" query type, and 1 work request may be associated with a "WIP" query type.

In some embodiments, a user with an administrator level of access (administrator) 206 may manage one or more access levels. Typically, the administrator may grant or revoke permission to one or more users into the one or more access levels. In some other embodiments, the administrator may add, modify, and/or delete the one or more access levels. In one aspect, the administrator may add, modify, and/or delete the one or more categories associated with a work request. In another aspect, the administrator may add, modify, and/or delete the one or more associates to provide one or more levels of access. FIG. 8 illustrates an exemplary embodiment of an administrator interface to add, modify, and delete associate information 800. As illustrated, the administrator interface 800 includes an associate information page 806. In one aspect, the associate information page 806 includes associate data 602 further comprising a serial number 602*a*, an associate name 602*b*, an associate identification number 602*c*, a work assignment 602*d*. As illustrated in FIG. 800, the interface also includes a quality control access page 804, a category access page 808, an archival updates page 810, and/or an administrator information page 802. The administrator may add, modify, and/or delete one or more associates accordingly.

FIG. 9 illustrates an exemplary embodiment of the category access page 808. In one aspect, the system may be configured to enable the administrator to add, modify, and/or delete categories 808. As illustrated, FIG. 9 includes a category identification number 808*a* and a category name 808*b*. In one aspect, the administrator may add, modify, and/or delete one or more categories using the interface as illustrated in FIG. 9. In some embodiments, the changes made to the one or more categories in the interface 808 may immediately be reflected as one of the options to sort one or more work requests. In some other embodiments, the one or more categories may be dynamically defined.

FIG. 10 illustrates a process flow for handling work requests 900. In some embodiments, the system may be configured to initiate the presentation of a first interface to enable an allocator to assign the work request to an associate to complete the work request, as shown in block 902. In one aspect, the work request includes a priority level. For example, a received work request may require a short turnaround time. In such situations, the work request may be associated with a priority level "high". In one aspect, the system may be configured to enable the allocator to assign a work request to an associate based on a priority level. In one aspect, the system may be configured to enable the allocator to assign a status to the work request. For example, the when assigning a work request, the status may be "new". In another aspect, the system may be configured to enable the allocator to assign a work request to an associate based on a qualification level associated with the associate. In yet another aspect, the system may be configured to enable the allocator to associate a category with the work request.

In response to receiving the work request, the system may be configured to initiate the presentation of a second interface to enable the associate to complete the work request and transmit the completed work request to an analyst for review, as shown in block 904. In one aspect, the system may be configured to enable the associate to change the status level based on at least an action performed on the work request. For example, when the associate retrieves a new work request, the system may enable the associate to change the work request from "new" to "work in progress (WIP)". In another example, if the associate has a question about the work request, the associate may send a query back to the source during which the status may change to "pending" when waiting for a response.

In response to transmitting the work request to an analyst, the system may be configured to initiate the presentation of a third interface to enable the analyst to review the completed work request and transmit the reviewed and completed work request to the associate, as shown in block 906. In response to reviewing the work request the analyst may determine if the processed work request was error free or error prone and transmit the reviewed work request back to the associate by changing the status to reflect the analyst's review. In response to transmitting the work request to the analyst, the system may be configured to initiate the presentation of a fourth interface to enable the administrator to generate a report based on at least the status associated with the work request, as shown in block 908.

FIG. 11 illustrates a process flow for allocating a work request 1000. In some embodiments, the system may be configured to enable a user to retrieve a work request received from a source, wherein the work request comprises an objective, as shown in block 1002. Typically, an objective is defined as a specific result that needs to be achieved within a time frame and with available resources. In response to retrieving the work request, the system may be configured to enable the user to assign a category to the work request based on at least the objective associated with the work request. In one aspect, the category may be predefined by an administrator. In addition, the system may be configured to choose an associate from a list of associates. In yet another aspect, the system may be configured to enable an allocator to sort the one or more work requests received from the source based on at least the category assigned to the work request, a received date and time, a subject description and/or a status to enable a seamless allocation process.

In response to assigning a category, the system may be configured to enable the allocator to allocate the work request to an associate based on at least the category associated with the work request, as shown in block 1006. In one aspect, the system may be configured to enable the allocator to dynamically receive new work requests by using the "refresh" option. In response, the allocator may transmit the work request to associate, as shown in block 1008. In some embodiments, once the work request has been assigned to the associate, the work request is assigned a unique identification number and a status reflecting a new work request.

FIG. 12 illustrates a process flow for processing a work request 1100. In some embodiments, the system may be configured to enable a user to retrieve the work request assigned by the allocator, as shown in block 1102. In one aspect, the work request may be associated with a status. For example, when a work request is initially assigned to an associate, the work request may be associated with a "new-request" status. In response to retrieving the work request, the system may be configured to identify the status associated with the work request, as shown in block 1104. In response, the system may be configured to enable the associate to address the work request based on at least the status associated with the work request, as shown in block 1106. For example, the associate may begin processing the work request if the status associated with the work request is "new-request". In another example, if the status associated with the work request is "QC done-error", the associate may understand that the completed work request has been assessed by the quality analyst and may contain at least one error for the associate to address. Once the work request is addressed, the system may be configured to enable a user to transmit the processed work request to an analyst for a quality assessment.

FIG. 13 illustrates a process flow for quality assessment of work requests 1200. In some embodiments, the system may be configured to enable a user to receive a processed request from an associate, as shown in block 1202. In one aspect, the processed work request may include a unique identification number, a status, or a priority level. In response to receiving the processed work request, the system may be configured to enable the user to review the processed work request, as shown in block 1204. In some embodiments, reviewing the work request includes determining whether the processed work request is error-free, as shown in block 1206. If the processed work request is error-free, then the system may be configured to change the status of the processed work request to reflect the error-free request, as shown in block 1210. In response to changing the status of the processed work request, the error-free work request is then placed in a queue for further action, as shown in block 1214. If the processed work request is error-prone, then the system may be configured to change the status of the processed work request to reflect the error-prone request, as shown in block 1208. In response to changing the status to reflect the error-prone request, the system may be configured to transmit the processed work request back to the associate, as shown in block 1212. In some embodiments, the work request is transmitted back to the associate for a post assessment review. During the post assessment review, the associate may choose to further discuss the quality assessment of the work request with the analyst in case the processed work request is error prone. In some other embodiments, the work request is transmitted back to the associate to transmit the processed work request to the source. In one aspect, the work request received from the source may include one or more objectives to be addressed/processed and the processed work request transmitted back to the source after quality assessment may include one or more completed objectives.

FIG. 14 illustrates a process flow for generating a tracking report 1300. In some embodiments, the system may be configured to retrieve a work request from a source, as shown in block 1302. In one aspect, the work request includes a status.

Typically, the status of the work request changes every time the work request is processed during the one or more phases of the work request. For example, when a work request is initially assigned to an associate, the work request may be associated with a "new" status. When the associate is processing the work request, the work request may be associated with a "work in progress" status. In response to retrieving the work request, the system may be configured to determine a duration of time that the work request has been associated with the status, as shown in block 1304. For example, the system may be configured to determine the duration of time that the work request has been in the "new" status. This may indicate the work load associated with an associate. In another example, the system may be configured to determine the duration of time that the work request has been "pending" to receive a response for a query from the source. This may help the associate to determine if a reminder has to be sent to the source to respond to the query.

In response to determining a duration, the system may be configured to initiate the presentation of a tracking report, as shown in block 1306. In one aspect, the tracking report may be a graphical representation of each of the statuses associated with the work request and the duration of time the work request has been associated with each of the statuses. In some embodiments, the duration of time of status associated with the work request may be associated with an alert. In some embodiments, the alert may be color based. In one aspect, the duration of time associated with the status may be compared to a predefined threshold to be associated with a work request. For example, if the work request remains in the same status for over 100 hours since the work request is received from the source, the work request may be associated with a red alert; if the work request remains in the same status for less than 50 hours since the work request is received from the source, the work request may be associated with a green alert; if the work request remains in the same status between 50 hours and 100 hours since the work request is received from the source, the work request may be associated with an amber alert. In one aspect, since the work request may be associated with only one status at a particular time instant, the work request may have only one alert at a particular time instant. In some other embodiments, the work request may associated with an alert by comparing the aggregated sum of the duration of time associated with the one or more statuses associated with the work request with a predefined threshold. In one aspect, the tracking report may include one or more ageing reports as shown in 701*a* and 701*b*. In another aspect, the tracking report may include a graphical representation of different statuses associated with the one or more work requests based on the one or more alerts, as shown in 720.

In some embodiments, the tracking report may include a representation of one or more work reports assigned to an associate based on the status associated with each of the one or more work requests, as shown in FIG. 6. In one aspect, the tracking report may include a total count of the one or more work requests assigned to an associate. In some other embodiments, the tracking report may include a representation of one or more work reports assigned to an associate based on the alerts associated with each of the one or more work requests.

In one aspect, the workflow management system may be configured to enable a user to archive processed work requests which are error-free. Typically, a user with administrator level access may execute the archival process. In some embodiments, the archival process may be configured to track the administrator associated with the archival process.

FIG. 15 illustrates a process flow associated with the archival process. In some embodiments, the system may be configured to enable the analyst to receive the processed work request as shown in bloc 1402. In response to receiving the processed work request, the system may be configured to enable the analyst to determine whether the processed work request is error-free, as shown in block 1404. In response to determining that the processed work request is error-free, the system may be configured to aggregate the error-free processed work requests associated with a time duration defined by a first time stamp and a second time stamp, as shown in block 1406. In response to aggregating the error-free processed work requests, the system may then be configured to archive the aggregated work requests, as shown in block 1408. In one aspect, the time duration associated with the archival process may be periodic. For example, the time duration may be daily, weekly, biweekly, monthly, or the like. In another aspect, the time duration associated with the archival process may be based on the number of error-free processed work requests associated with the time duration. In some embodiments, if the number of error-free processed work requests in the queue is greater than a predefined threshold, the archival process may be initiated. In some embodiments, the archival process may be initiated manually. In some other embodiments, the archival process may be initiated automatically based on predefined user parameters.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for allocating a work request, the system comprising:

at least one processor;

a memory;

an assignment routine comprising computer instruction code executable by the at least one processor, and structured to cause said at least one processor to initiate a presentation of a first user interface to enable a first user to:

electronically receive a work request from a source via a network of distributed servers, wherein the work request comprises an objective and a priority level, wherein the objective comprises one or more results that need to be achieved within a predetermined time period and one or more allocated resources required for the objective, wherein the work request is sorted using the priority level;

assign a category to the work request based on at least the objective and the priority level associated with the work request, wherein assigning the category further comprises: (i) determining that a length of outstanding time associated with the work request is greater than a predetermined number of hours and assign a category indicating that the work request requires immediate attention, and (ii) determining that a length of outstanding time associated with the work request is lower than a predetermined number of hours and assign a category indicating that the work request does not require immediate attention;

electronically allocate the work request to a second user based on at least the category associated with the work request; and electronically transmit the work request to the second user, wherein the category is assigned to the work request based on at least continuously monitoring the length of outstanding time associated with the work request; and a work request tracking routine comprising computer instruction code executable by the at least one processor, and structured to cause said at least one processor to initiate a presentation of a second user interface to enable the second user to:

retrieve the work request, wherein the allocated work request comprises a status, wherein the status indicates a level of completion associated with the work request;

process the work request, wherein processing the work request further comprises addressing the work request based on at least the status and the priority level associated with the work request, wherein addressing the work request comprises continuously monitoring the level of completion associated with the work request, thereby improving tracking efficiency of the work request; and electronically transmit the processed work request to a third user for a quality assessment.

2. The system of claim 1, wherein the module is configured to initiate the presentation of the first user interface to the first user based on at least an authorization of an allocator level authentication credentials.

3. The system of claim 1, wherein the module is configured to initiate the presentation of the second user interface to the second user based on at least an authorization of an associate level authentication credentials.

4. The system of claim 1, wherein the work request comprises a unique identification number.

5. The system of claim 1, wherein the module enables the work request to be sortable based on at least the priority level associated with the work request.

6. The system of claim 1, wherein the category is predefined and customizable.

7. The system of claim 1, wherein the second user interface enables the second user to realign the work request, wherein realigning the work request comprises transmitting the work request to a fourth user, wherein the fourth user has the associate level authentication credentials.

8. The system of claim 1, wherein the second user interface enables the second user to track the realignment.

9. The system of claim 8, wherein the second user interface enables the second user to change the category associated with the work request prior to transmission of the work request to the fourth user.

10. The system of claim 8, wherein the second user interface enables the second user to append comments with the work request prior to the transmission of the work request to the fourth user.

11. The system of claim 1, wherein the second user interface initiates the presentation of a notification, wherein the notification is an indication that the work request has been allocated to the second user manually, independent of the system.

12. The system of claim 11, wherein the second user interface enables the second user to synchronize the work request allocated manually with the work request allocated using the system, wherein the work request allocated manually is assigned a unique identification number after synchronization.

13. The system of claim 1, wherein the first user interface further comprises a selected mailbox, wherein the selected mailbox comprises the work request selected by the first user to be allocated to the second user.

14. The system of claim 1, wherein allocating the work request further comprises allocating the work request to the second user based on at least a skill level of the second user.

15. The system of claim 1, wherein allocating the work request to the second user further comprises selecting the second user from a drop down list.

16. The system of claim 1, wherein user interface further comprises a submit option to execute the allocation of the work request to the associate.

17. The system of claim 1, wherein transmitting the work request to the second user comprises sending a notification, wherein sending a notification comprises sending an email, a text message, or a pop-up message.

18. The system of claim 1, wherein the first user interface further comprises a select and deselect option, wherein the select option enables the first user to select at least one work request to be allocated to the second user, wherein the deselect option enables the first user to deselect at least one work request selected to be allocated to the second user.

19. A method for allocating a work request, the method comprising:

initiating a presentation of a first user interface to enable a first user to:

electronically receive a work request from a source via a network of distributed servers, wherein the work request comprises an objective and a priority level, wherein the objective comprises one or more results that need to be achieved within a predetermined time period and one or more allocated resources required for the objective, wherein the work request is sorted using the priority level;

assign a category to the work request based on at least the objective and the priority level associated with the work request, wherein assigning the category further comprises: (i) determining that a length of outstanding time associated with the work request is greater than a predetermined number of hours and assign a category indicating that the work request requires immediate attention, and (ii) determining that a length of outstanding time associated with the work request is lower than a predetermined number of hours and assign a category indicating that the work request does not require immediate attention;

electronically allocate the work request to a second user based on at least the category associated with the work request; and electronically transmit the work request to the second user, wherein the category is assigned to the work request based on at least continuously monitoring the length of outstanding time associated with the work request;

initiating a presentation of a second user interface to enable the second user to:

retrieve the work request, wherein the allocated work request comprises a status, wherein the status indicates a level of completion associated with the work request;

process the work request, wherein processing the work request further comprises addressing the work request based on at least the status and the priority level associated with the work request, wherein addressing the work request comprises continuously monitoring the level of completion associated with the work request, thereby improving tracking efficiency of the work request; and electronically transmit the processed work request to a third user for a quality assessment.

20. A computer program product for a system for allocating a work request, the computer program product comprising a non-transitory computer-readable medium comprising code causing a first apparatus to:

initiate a presentation of a first user interface to enable a first user to:

electronically receive a work request from a source via a network of distributed servers, wherein the work request comprises an objective and a priority level, wherein the objective comprises one or more results that need to be achieved within a predetermined time period and one or more allocated resources required for the objective, wherein the work request is sorted using the priority level;

assign a category to the work request based on at least the objective and the priority level associated with the work request, wherein assigning the category further comprises: (i) determining that a length of outstanding time associated with the work request is greater than a predetermined number of hours and assign a category indicating that the work request requires immediate attention, and (ii) determining that a length of outstanding time associated with the work request is lower than a predetermined number of hours and assign a category indicating that the work request does not require immediate attention;

electronically allocate the work request to a second user based on at least the category associated with the work request; and electronically transmit the work request to the second user, wherein the category is assigned to the work request based on at least continuously monitoring the length of outstanding time associated with the work request;

initiate a presentation of a second user interface to enable the second user to:

retrieve the work request, wherein the allocated work request comprises a status, wherein the status indicates a level of completion associated with the work request; and process the work request, wherein processing the work request further comprises addressing the work request based on at least the status and the priority level associated with the work request, wherein addressing the work request comprises continuously monitoring the level of completion associated with the work request, thereby improving tracking efficiency of the work request; and electronically transmit the processed work request to a third user for a quality assessment.

\* \* \* \* \*